June 23, 1931.   H. J. KASCH   1,811,086
METHOD OF MOLDING ARTICLES PRODUCED FROM PLASTIC MATERIALS
Filed Jan. 3, 1927
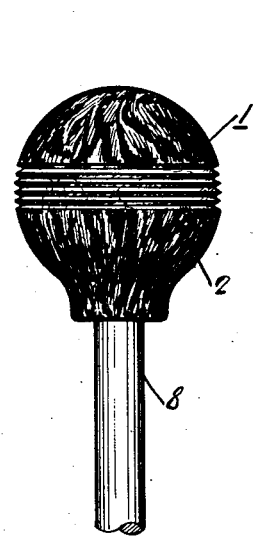
Fig. 1.
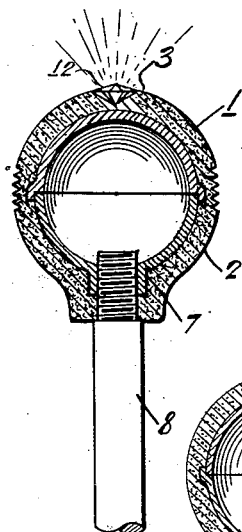
Fig. 2.
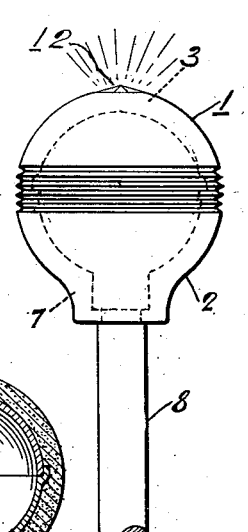
Fig. 3.
Fig 8
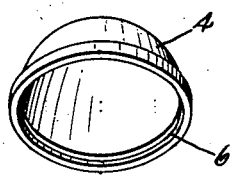
Fig. 4.
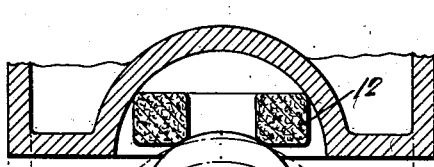
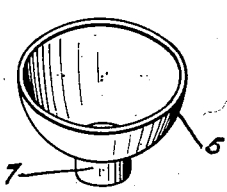
Fig. 5.
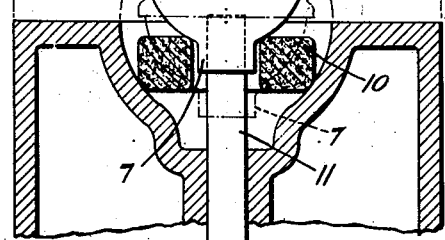
Fig. 6.
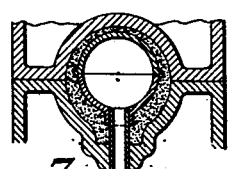
Fig. 7.
Inventor
Henry J. Kasch
By _____ Attorney Patented June 23, 1931

1,811,086

UNITED STATES PATENT OFFICE

HENRY J. KASCH, OF DAYTON, OHIO, ASSIGNOR TO THE KURZ-KASCH COMPANY, OF DAYTON, OHIO, A CORPORATION OF OHIO

METHOD OF MOLDING ARTICLES PRODUCED FROM PLASTIC MATERIALS

Application filed January 3, 1927. Serial No. 158,782.

My invention relates to the molding of articles from plastic material and particularly from phenolic condensation products, and analogous materials.

The invention pertains more especially to the production of molded articles having considerable thickness or bulk, and involves the molding of a comparatively thin stratum of material of substantially uniform thickness about the exterior of a core having the approximate contour and proportions of the finished product, but of smaller size. The use of such a core of heat conductive material, not only economizes molding materials but by transmitting heat to the interior of the body of molding material, it enables a more thorough and uniform fusing thereof and better "flow" conditions.

Commercial phenolic condensation products, which are the preferred, though not necessarily the only suitable materials for carrying out the invention, begin to fuse or soften at approximately two hundred to two hundred and twenty degrees, Fahrenheit. The normal molding temperature, usually employed, is from two hundred and sixty to three hundred degrees. Beyond three hundred degrees Fahrenheit, a chemical reaction takes place and the material which became soft and plastic at a lower temperature then becomes set or hardened.

The material is molded under pressure in heated molds in which the material is fused to proper molding consistency and subsequently "cured" by a substantial increase of the mold temperature.

When articles necessitating a thick mass of material, such as knobs, balls, handles and bulky articles are to be molded, the heat of the mold does not quickly penetrate the mass of material. As a consequence, the material is not uniformly and thoroughly fused throughout the mass. In such case the exterior of the mass reaches an excessively fluid condition before the center of the mass is sufficiently plastic. The time factor is an important consideration in commercial production, so that an increase of the period for heat penetration cannot always be allowed. In the present instance the difficulty is overcome by employing a core of heat conductive material, preferably metallic, which will not only confine the material to a comparatively narrow space between the core and the wall of the mold, thus economizing materials, but the mold heat is enabled to penetrate such restricted body of material, and furthermore the metallic core, which is preferably hollow, absorbs heat from the the mold which it transmits to the interior of the body of material confined in such restricted space. The core being hollow contains a body of air which becomes highly heated and assists in equalizing the temperature interiorly and exteriorly of the mass of molded material. This substantial equalization of interior and exterior temperature insures uniform molding conditions throughout the mass. This construction has the further advantage of causing a considerable displacement or flow of material during its compression within the mold, thereby enabling the production of various ornamental surface effects. When such core is omitted and a solid body of material completely filling the mold is employed, the material is more or less inert and sluggish with little or no surface movement or flow during the molding operation, and consequently ineffective to produce ornamental surface designs, by intermixture of differently colored materials.

The object of the invention is to simplify and improve the means and mode of operation of molding articles from plastic material whereby they will not only be cheapened in production, but will be of more uniform character, capable of producing ornamental surface flow lines, of increased strength and durability and unlikely to get out of repair.

A further object of the invention is to provide means for affording a more uniform distribution of heat through a mass of molding material to insure uniform fusing and curing of the material, and more particularly to provide a heated core about which the article is molded.

A further object of the invention is to provide means for insuring a disturbance and distribution movement of the material during the molding operation, to induce flow lines upon the surface of the finished article.

A further object of the invention is to provide a knob or the like which will be strong and durable and which will require but a minimum amount of molding material in its production.

With the above primary and other incidental objects in view as will more fully appear in the specification, the invention consists of the means and method, and the features of construction and operation, or their equivalents, as hereinafter described and set forth in the claims.

In the accompanying drawings wherein is illustrated the preferred, but obviously not necessarily the only form of embodiment of the invention, Fig. 1 is a side elevation of a completed knob. Fig. 2 is a sectional view. Fig. 3 is a detail view. Figs. 4 and 5 are detail perspective views of the separable cup shaped insert sections. Fig. 6 is a detail sectional view illustrating the molding operation. Fig. 7 is a further view showing the mold closed. Fig. 8 is a sectional view of the preferred commercial form of knob.

Like parts are indicated by similar characters of reference throughout the several views.

For purpose of illustration a substantially spherical gear shift lever knob or the like has been adopted. It is to be understood that the invention is equally applicable to other articles of different shapes, embodying the same general features of construction and method of molding.

In the drawings 1 is a completed article which consists of a continuous integral exterior stratum 2 of phenolic condensation or analogous material, molded in situ about a hollow core 3 of heat conductive material. In the present instance the core 3 comprises two substantially semi-spherical cups 4 and 5, arranged with their margins abutting one upon the other. These core members are preferably stamped from sheet metal. One of the cup shaped core members is formed with a marginal rabbet 6 in which the margin of the other member is seated. A boss 7 is provided upon one of the core members for attachment of the finished article to its support 8, which in the present instance is the gear shift lever of an automobile. The boss 7 is preferably though not necessarily interiorly screw threaded to facilitate its engagement with the lever.

In molding the stratum 2 about the core, a measured quantity of material is placed in a mold of proper shape, as shown at 10 in Fig. 6. The core 3 is then positioned centrally in the mold upon the body 10 of molding material. A stud or pin 11 projecting from the bottom of the mold serves to position the core. This stud 11 may if desired be hollow and serve to conduct heating medium to the interior of the insert 3. The stud or pin 11 extends through the boss 7 into the hollow interior of the core, which is free to slide thereon as the mold closes and the body of material 10 is fused. A second body 12 of material is preferably placed on top of the core within the upper section of the mold. The mold sections are heated to the required temperature, preferably by steam. The core 3 being of metal and having comparatively thin walls quickly absorbs heat from the mold. The heated core insures a more uniform heating and fusing of the molding material, which being rendered of substantially equal consistency throughout flows evenly, and the character of flow can be predetermined and regulated by regulation of the temperature.

It is recognized that it is not broadly new to mold phenolic materials around a core, since solid wood cores have before been used. However such cores do not have the capability for transmitting and equalizing the heat upon the interior of the stratum of molding material, and are subject to warping and cracking, and cause fracture of the enclosing body of molded material by the expansion and contraction of the core. Moreover such wood cores necessitate the use of metal bushings to enable their connection to a support. The use of a hollow metallic core of the character described overcomes the objections to wooden cores and enables rapid, uniform and economical commercial production.

While the use of two preformed tablets 10 and 12 has been shown it is not essential that the molding charge be thus divided, but the material may be deposited in the mold in powder form, or may be embodied in a single tablet or measured charge.

The lower tablet is of annular form, having a hole therein to accommodate the boss 7 and stud or pin 11. The upper tablet is preferably though not necessarily also of annular form. The flow effect or displacement caused by confining the material between the heated inner core and the wall of the mold, facilitates the formation of ornamental surface markings, by molding an intermixture of differently colored materials at a subnormal temperature in accordance with the method disclosed in Copeland Patent No. 1,593,525 of July 20, 1926, or in imitation of onyx, agate, marble and the like, as described in the copending application of Copeland, Serial No. 139,556 filed October 4, 1926.

The heated core 3 is formed in two sections for convenience of manufacture by stamping from sheet metal. However one piece hollow cores, formed from sheet metal by successive operations, or seamless cores formed by electrodeposit processes may be employed. Such hollow core may be economically formed from metallic tubing by contracting the tubing and closing its end in a suitable die, or by other forming operation.

In practice the operator preheats the cores by maintaining a supply of insert cores on a hot plate or heated portion of the molding press until needed. The insert cores thus preheated preparatory to insertion in the mold greatly facilitates the molding operation by presenting to the molding material a second heated surface in spaced relation with the heated wall of the mold, between which heated surfaces the material is rapidly and uniformly fused. Other means of preheating the inserts, as in a retort, or oven or otherwise may be employed. In many instances the absorption of heat from the mold and transmission of heat to the core 3ª through the stem 11 will be found sufficient.

It is obvious that if found expedient the hollow interior of the insert core may be connected with the steam or hot air chamber of the mold, or other source of supply of heating medium through the hollow stem 11 as indicated in Fig. 7.

By confining the material to a small space contiguous to the wall of the mold, not only is less material required but being of less thickness the mold heat more readily penetrates the mass of material, reducing it uniformly to molding condition. The use of a preheated core enables the application of heat to the inner side as well as to the outside of the molding mass and insures uniform fusing and subsequent curing of the material. The greater displacement of material and flow currents induced in the restricted space between the core and mold, than when the core is omitted, greatly facilitates the production of surface ornamentation by inducing harmonious flow lines of differently colored materials.

When the knob herein described is to be used upon a gear shift lever for automobiles or in other positions where it will be more or less obscured, it is found desirable and convenient to provide a brilliant marker, or reflector button, 12 on the knob in such position as to catch and reflect light from an automobile cowl lamp, or other source of illumination. This marker 12 may be a plain glass button, preferably though not necessarily having a silvered back to afford a reflecting mirror effect, or it may be cut to afford a plurality of angularly arranged facets affording multiple light reflections.

Thus in the case of an automobile shift or brake lever the knob can be readily and instantly found for emergency operation, and moreover the appearance of the knob is further enhanced.

Fig. 8 illustrates a commercial form of the present knobs now being manufactured. The external boss on the insert form is omitted and screw threads are formed directly in the molded material. The hollow insert is shown somewhat flattened adjacent to the threaded opening.

While the invention, for illustrative purposes, is shown embodied in a simple form of spherical knob, it is to be understood that various hollow articles of irregular contour may also be formed by the present method of molding.

Likewise the knobs molded by the present process may include door knobs, switch knobs, implement handles, and various articles other than gear shift lever knobs. Whereas "phenolic condensation materials" as ordinarily used include materials some of which may be capable of being cold pressed, as well as those requiring the application of heat for molding operations, therefore the term "phenolic condensation material" as herein employed is to be understood as including analogous plastic molding compositions.

From the above description it is apparent there is thus provided a method of molding articles from plastic materials possessing the particular features of advantage before enumerated as desirable, but which obviously is susceptible of modification in its steps, arrangement of parts, and details of operation, without departing from the principle involved or sacrificing any of its advantages.

While in order to comply with the statute, the invention has been described in language more or less specific as to specific steps and structural features, it is to be understood that the means and method disclosed comprises but one of several forms of putting the invention into effect and that the invention is therefore claimed in any of its forms or modifications within the legitimate and valid scope of the appended claims.

Having thus described my invention, I claim:

1. The herein described method of molding articles from phenolic condensation material and the like, consisting in preheating a hollow metallic form having substantially the same shape and proportions but of less size than the finished article, enclosing the preheated core in a matrix, and molding thereabout a stratum of phenolic condensation material under influence of external heat and pressure of substantially uniform thickness.

2. The herein described method of molding articles of phenolic condensation material or the like, consisting in employing a sectional hollow core member of approximately the contour of the finished article but of somewhat less size preheating the core and molding in situ thereabout a stratum of phenolic condensation material of substantially uniform thickness.

3. The herein described method of molding articles from plastic materials and the like, including inserting a preheated core within a hollow mold and molding the material in situ about the preheated core and intermediate the core and the wall of the mold.

4. The herein described method of molding plastic material and the like, including inserting a preheated core of heat conductive material within a heated mold and molding the material in situ about the exterior of said heat conductive core and intermediate the core and the wall of the mold.

5. The herein described method of molding articles from phenolic material and the like, consisting in preheating a core of non-phenolic material, placing the preheated core in a mold and molding a quantity of phenolic material in situ about the exterior of the preheated non-phenolic core and intermediate said core and the wall of the mold.

6. The herein described method of molding articles from plastic material including providing a preheated core to be permanently embedded in the article and transmitting heat from said core to the interior of the mass of material being molded whereby said material is fused into conformity therewith.

In testimony whereof, I have hereunto set my hand this 1st day of November, 1926.

HENRY J. KASCH.